Figure 1:
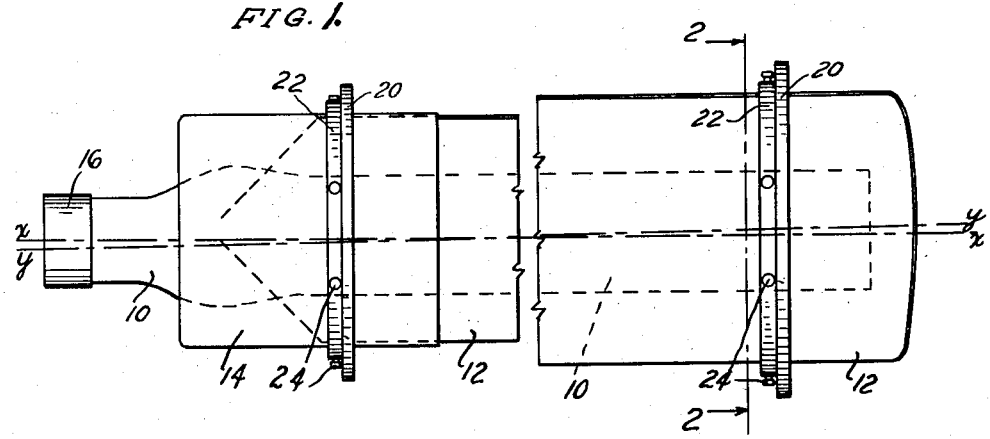

March 26, 1957  W. E. ARNOLDI  2,786,262

PROPELLER MANUFACTURE

Filed Dec. 20, 1952

INVENTOR.
WALTER E. ARNOLDI

BY Roger B. McCormick

ATTORNEY

United States Patent Office 2,786,262
Patented Mar. 26, 1957

2,786,262

PROPELLER MANUFACTURE

Walter E. Arnoldi, West Hartford, Conn., assignor to United Aircraft Corporation, East Hartford, Conn., a corporation of Delaware Application December 20, 1952, Serial No. 327,118

2 Claims. (Cl. 29—156.8)

This invention relates to improvements in propeller manufacture and, more specifically, to improvements in the manufacture of detachable blade type aeronautical propellers.

At the outset, it should be understood that aeronautical propellers must be balanced within close tolerances in order to avoid objectionable vibration of the propeller-driven aircraft. It should also be understood that with larger aircraft, which may include enlarged structural areas particularly sensitive to vibrations, the balance tolerance factor becomes proportionately more restrictive, and the attainment of propeller balance within satisfactory limits becomes increasingly more difficult. Also, the balance tolerances are proportionately more restrictive as the propellers become larger and more heavily loaded and as the engine power output increases.

Unbalance falls within four general categories, namely; mass force, mass moment, aerodynamic force and aerodynamic moment. Mass force balance in a propeller assembly is generally achieved by manufacturing each blade within close tolerances of blade weight and center of gravity location, any residual mass force unbalance in the assembled propeller being corrected by adding compensating weight to the assembly at a suitable location in the plane of the propeller center of gravity so that the resultant center of gravity will fall on the axis of the propeller shaft.

Aerodynamic force and aerodynamic moment unbalance in a propeller assembly are generally corrected by compromise. That is, one or more blades in the assembly may be adjusted in pitch angle so as to approximately match the aerodynamic behavior of all the blades in the assembly.

Heretofore, it has been general practice to achieve mass moment or dynamic balance by adding corrective weights in suitable locations on the hub of the assembled propeller. The corrective weights are attached in two or more planes normal to the propeller shaft axis so that centrifugal forces on the weights produce a moment equal and opposite to the mass moment unbalance.

However, this method of mass moment unbalance correction is subject to certain disadvantages. For example, the blades in the assembly are dynamically unmatched except for incidental matching which may occur from manufacture to geometric tolerances established primarily to achieve mass force balance. Due to the unmatched relationship of the blades, the mass moment correction is frequently great in terms of total added weight and may exceed safe limits for attachment to the hub. Furthermore, mass moment balance with unmatched blades imposes limitations upon blade interchangeability in service.

It is the general object of the present invention to provide an improved process for the manufacture of an aeronautical propeller which includes steps to assure substantial mass moment balance of the propeller.

Another object of the invention is to provide for mass moment balance of an aeronautical propeller without the addition of corrective weights.

A further object of the invention is to provide for mass moment balance of a propeller in such a way as to have the blades thereof substantially matched.

Additional objects and advantages of the invention will become apparent to those skilled in the art from the following description which relates to the steps to be followed in carrying out my improvements in propeller manufacture.

A propeller assembly is in mass moment balance when one principal axis of inertia of the propeller coincides with the axis of the propeller shaft. This condition will be achieved when the principal axes of inertia of the blades all have the same geometric relationship to the propeller shaft axis and when the mass forces of the blades are balanced about the shaft axis. It is not necessary that the principal axes of the blades also be principal axes of the propeller.

Experience has shown that blades which are not matched as to mass moment unbalance are the principal cause of mass moment unbalance in propeller assemblies. The contribution of the propeller hub to mass moment unbalance is very limited because of the close machining tolerances under which the hub is fabricated.

In accordance with the present invention, a method of propeller manufacture is provided which minimizes mass moment unbalance of a propeller assembly by dynamically matching the blades incorporated in the assembly. In matching the blades, the orientation of the longitudinal principal axis of inertia of each blade relative to its pitch change axis will be controlled so as to be identical to the orientation in a master blade or as specified by design requirements. It may be desirable, in some cases, to balance each blade about its pitch changing axis thus locating the longitudinal principal axis of inertia of the blade on the pitch changing axis. However, it will probably more often be desirable to have the pitch changing axis and longitudinal principal axis in some other relationship. In this more general case, all of the blades of the propeller assembly are unbalanced about their pitch changing axes, but the amount and direction of this mass moment unbalance are substantially identical for all blades, thus the blades are dynamically matched. When incorporated in an assembly with a symmetrical hub, the propeller formed thereby will be symmetrical and have a resultant principal axis of inertia which substantially coincides with the propeller shaft axis.

In carrying out the invention, conventional balancing apparatus, such as the Gisholt type U balancing machine, may be used to indicate the degree of mass moment unbalance in a blade. The unbalance may be expressed either in terms of moment unbalance about an arbitrary geometrical axis or as the spatial relationship between the longitudinal principal axis and an arbitrary geometrical axis.

The balancing machine may be used one or more times during blade fabrication. For example, assume that the propeller under construction utilizes hollow metal, core-and-shell type blades. After the shell of a blade has been secured to the core and before the low-density filler material has been added between the core and shell, the blade can be placed on the balancing machine to indicate the principal axis orientation, or mass moment unbalance. Control of principal axis orientation can then be exercised by increasing and/or decreasing the density of the filler in strategically located areas between the core and the shell.

As another example, the unbalance can be measured after the blade has been formed except for its cuff. Axis orientation can then be controlled by preforming the cuff to correct the unbalance as desired. This can conveniently be accomplished by fabricating a cuff of greater weight or mass on one side (the leading edge side or trailing edge side) than on the other side, thus shifting or re-locating the principal axis.

It should be understood that the foregoing are illustrative examples only and such balancing steps may be followed exclusive of one another or both can be incorporated, with or without other balancing steps, in the fabrication of a blade.

It will also be understood that in accordance with the aforedescribed balancing steps, axes control is effected by orienting or locating the longitudinal principal axis of the blade with respect to an arbitrary geometric axis which may be the pitch changing axis.

As an alternative, and probably preferable, method of control, or for further balance correction after the blade has been substantially completed, the location of the pitch changing axis may be altered to obtain the desired relationship with the principal axis. This is accomplished by machining the retention means on the shank end of the blade so as to establish the pitch changing axis in the desired location relative to the longitudinal principal axis.

Figure 2:
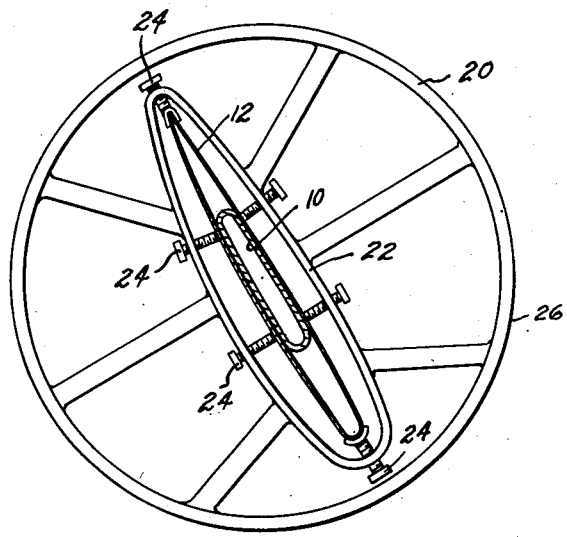

Since this last mentioned method of control is preferable in carrying out the novel principle of describing and utilizing unbalance measurements in terms of principal axis orientation instead of mass moment unbalance, the technique of locating the pitch changing axis relative to the longitudinal principal axis of inertia is further described with reference to the accompanying drawing, wherein, Fig. 1 is a foreshortened plan view of a blade held within clamp means suitable for mounting upon a conventional balance machine; and Fig. 2 is a transverse sectional view taken as indicated by line 2—2 of Fig. 1.

For purposes of illustration, a hollow metal blade comprising a core 10 and shell 12 has been shown. In this type blade, the shell 12 provides an airfoil envelope for the core 10 which extends lengthwise within the shell and projects from the shank end thereof. The inboard or shank end of the shell is closed by a cuff 14 and the shank end of the core is received within the propeller hub, not shown. The said core shank is generally of circular transverse cross-section and it is common practice to provide retaining means thereon such as external ball races which receive retaining balls when fitted within the hub. When formed with retaining means such as the ball races, the center line of the circular transverse cross-section defines the pitching changing axis of the blade.

It will be noted that the blade shown in the drawing has not been formed with such races or other retaining means. The races will be provided on that portion of the core marked by the numeral 16. In all other respects, the blade has been completed and, after providing the races or other retaining means on the shank, the blade will be ready for assembly in a propeller.

It will be understood that the location of the aforesaid races determines the location of the blade's pitch change axis. As previously mentioned, the present method contemplates locating the blade's pitch change axis with reference to its longitudinal axis of inertia. Accordingly, the problem is to machine the ball races with reference to the longitudinal axis of inertia.

Assume line $x$—$x$ in Fig. 1 to be the principal longitudinal axis of inertia of the blade—the longitudinal axis about which the blade can be rotated as a dynamically balanced body. The axis $x$—$x$ can be located by placing the blade in a balancing machine and adjusting its position therein until the amount of mass moment unbalance indicated during rotation is zero. The blade will then be rotating about the line $x$—$x$. If the blade is then removed from the balancing machine and placed in a machine tool to rotate about the axis $x$—$x$ as determined in the balancing machine, the ball races or other retaining means can be formed on the shank end of the core so that the pitch changing axis will coincide with the longitudinal principal axis of inertia $x$—$x$. The blade will then be in mass moment balance about its pitch changing axis.

It may be more desirable to locate the pitch changing axis in other than coincident relationship with the longitudinal axis of inertia. For example, the ball races can be formed about an axis $y$—$y$ which bears a desired linear and angular relationship to the longitudinal axis of inertia $x$—$x$. The axis $y$—$y$ can be located by adjusting the position of the blade in the balancing machine until the machine indicates a mass moment unbalance expressed in terms of axis orientation defining the axis of rotation of the blade on the balancing machine as being coincident with the pre-selected axis $y$—$y$. If the blade is then removed from the balancing machine and placed in a machine tool to rotate about the axis $y$—$y$ as located by the balancing machine, the ball races can be formed about that axis, thus defining the pitch changing axis as coincident to the axis $y$—$y$.

In summary then, the described alternative method of axis orientation comprises locating the pitch changing axis of a blade upon an axis $y$—$y$. The axis $y$—$y$ may be oriented to assume any of a variety of preselected locations relative to the longitudinal axis of inertia. If desired, the axis $y$—$y$ can be located on the longitudinal axis of inertia $x$—$x$, placing the blade in mass moment balance. If desired, the axis $y$—$y$ can be located in some preselected linear and angular relationship to the longitudinal axis of inertia $x$—$x$ whereby the blade is in mass moment unbalance. If all blades utilized in a propeller assembly have identical unbalance conditions, the blades will be dynamically matched or matched as to their principal axes orientation, thus effecting mass moment balance of the assembly. If axis orientation standards are established for the manufacture of all similar propeller blades, the blades can be utilized interchangeably in one or more propeller assemblies without destroying mass moment balance of the said assemblies.

For purposes of illustration, there has been shown in the drawing exemplary clamp means which may be utilized to adjustably position the blade in the balancing machine for axis orientation and which may also be utilized to position the blade in a machine tool for rotation about the selected axis $y$—$y$. The said clamp means comprise a pair of similar rings 20, 20 of sufficient diameter to fit over the blade and be supported thereon by hub-like members 22, 22.

Each member 22 is formed in general airfoil configuration and embraces the blade in spaced relationship. A plurality of jack screws 24, 24 (six shown) are rotatably supported in each member 22 and arranged to engage the blade. Preferably, two such screws 24, 24 are arranged to engage each flattened face of the blade, one screw to engage the leading edge thereof, and one to engage the trailing edge. Adjustment of opposing screws will adjust the position of the blade relative to the ring 20 and hub member 22.

The rings 20, 20 each have a hardened outer peripheral surface 26 which provides a bearing surface for supporting the blade in a balancing machine. The blade is then rotated on the bearing rings 20, 20 and the amount of dynamic unbalance is indicated. The blade is then adjusted to relative to the rings by turning the appropriate screws 24, 24 until the desired axis orientation is achieved.

It should be understood that the invention is not limited to the aforedescribed methods of achieving dynamic balance of a propeller otherwise than indicated by the scope of the claims which follow.

I claim:

1. A method of achieving force and mass moment balance in a detachable blade type aeronautical propeller comprising the steps in the manufacture of each blade therefor of rotating the blade about a generally longitudinally extending axis, locating the longitudinal principal axis of inertia of the blade with respect to said generally longitudinal axis, adjusting the generally longitudinal axis of rotation to re-locate the same in preselected relationship with the said principal axis, and machining the shank end of the blade while rotating the same on the relocated generally longitudinally extending axis whereby to form blade-retaining means on said shank with reference to said relocated generally longitudinally extending axis and thereby to establish a pitch change axis on said re-located generally longitudinally extending axis in substantially the same preselected relationship with the principal longitudinal axis of inertia of the machined blade.

2. A method of achieving force and mass moment balance in a detachable blade type aeronautical propeller comprising the steps in the manufacture of each blade therefor of rotating the blade about a generally longitudinally extending axis, locating the longitudinal principal axis of inertia of the blade with respect to said generally longitudinal axis, adjusting the generally longitudinal axis of rotation to relocate the same in coincident relationship with the said principal axis, and machining the shank end of the blade while rotating the same on said re-located generally longitudinal axis of rotation whereby to form blade-retaining means on said shank with reference to said re-located generally longitudinal axis of rotation and thereby to establish a pitch change axis on said re-located generally longitudinally extending axis of rotation in substantially coincident relationship with the principal longitudinal axis of inertia of the machined blade.

References Cited in the file of this patent

UNITED STATES PATENTS

| 1,880,313 | Charavay | Oct. 4, 1932 |
| 1,968,540 | Squires | July 31, 1934 |
| 2,203,782 | Hem | June 11, 1940 |
| 2,421,956 | McComb | June 10, 1947 |
| 2,436,096 | Chubb | Feb. 17, 1948 |
| 2,451,541 | Doman | Oct. 19, 1948 |
| 2,465,007 | Bragdon et al. | Mar. 22, 1949 |

FOREIGN PATENTS

| 538,698 | Great Britain | Aug. 13, 1941 |